Patented Jan. 5, 1937

2,066,367

UNITED STATES PATENT OFFICE 2,066,367

ALKOXYALKYL MERCURIC SALTS OF POLYBASIC ACIDS

Fritz Schönhöfer, Wuppertal-Elberfeld, and Wilhelm Bonrath, Leverkusen-I. G. Werk, Germany, assignors to Winthrop Chemical Company, Inc., New York, N. Y., a corporation of New York No Drawing. Application June 9, 1934, Serial No. 729,930. In Germany April 6, 1929

9 Claims. (Cl. 260—13)

This invention has for its object the production of alkoxyalkyl mercuric salts of polybasic acids suitable for use as disinfectants, which are highly efficacious against plant pests and micro organisms, such as bacteria, moulds and the like, with the result that they can likewise be employed for all purposes of preserving or disinfecting, for example, immunizing of grain or the like, the preservation of wood, the prevention of mildew formation, the preservation of glue and the like.

The new compounds, which may be incorporated with the material which is liable to be attacked by micro organisms, correspond to the general formula:

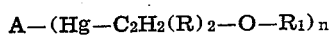

$$A-(Hg-C_2H_2(R)_2-O-R_1)_n$$

in which A denotes any salt forming group, especially the radical of an oxygen-bearing, polybasic acid of a non-metallic element of groups four and five of the periodic system, that is of polybasic carboxylic acids, phosphoric acid and silicic acid, R denotes hydrogen or an alkyl radical, $R_1$ denotes an alkyl or $-C_2H_2(R)_2-Hg-A$ radical, R and A being defined as above, and $n$ denotes an integral number which is at most equivalent to the number of acid groups in said polybasic acid.

As additions to the above compounds, appropriate diluents, filling, absorption or wetting agents or other substances exerting a fungicidal effect in either a wet or dry process may be employed, the compounds in question being usually employed in the form of dispersions therewith.

Tests have shown that the compound

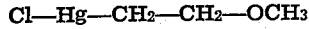

$$Cl-Hg-CH_2-CH_2-OCH_3$$

for example, prevents germination of stone blight spores at a concentration much below that which would endanger the seed grain. This effect is of great importance, since mercuric compounds of the type described above can be easily prepared in a manner similar to that described in "Berichte der deutschen chemischen Gesellschaft", vol. 46 (1913), page 2864 et seq. for the production of the alkoxy-alkyl mercuric acetate. Further methods for the production of the new compounds will be illustrated in the following examples. Whereas the carboxylic acid salts and phosphates are usually pure bodies, the silicates apparently very often consist of mixtures, since the initial silicious materials usually consist of mixtures. Ordinary waterglass or sodium silicate consists in most cases of tri- and tetra-silicates ($Na_2Si_3O_7$ and $Na_2Si_4O_9$). Furthermore, besides these salts, the presence of a di-silicate ($Na_2Si_2O_5$) is assumed in literature.

According, for example, to the specific material to be disinfected, the organic mercuric compounds are applied in the most variable manner, as can be seen from the examples. The quantities of the disinfectants to be added may vary within wide ranges. When carrying out our invention everyone skilled in the art will be in a position to determine without difficulties the most suitable concentration for any specific purpose in view.

Further information can be found in our copending application Serial No. 440,647, filed March 31st, 1930, now U. S. P. 1,967,372 issued July 24, 1934, of which the present application is a continuation in part. The before mentioned ether alkylene mercuric salts, such as oxalates, tartrates, succinates, phthalates, phosphates and silicates, are particularly valuable and generally superior to the salts of mono-basic acids and soluble salts of poly-basic acids in that most of them are highly insoluble in water and therefore give a very lasting disinfecting or immunizing effect.

The following examples will further illustrate the nature of our present invention which latter is, however, not restricted thereto, and is limited only by the appended claims. The parts are by weight.

*Example 1.*—15.9 parts of methoxy ethyl mercuric acetate are dissolved in the same quantity of water, whereupon a mixture of 20 parts of commercial water glass (solution of from about 1.35 to 1.4 specific gravity) and 25 parts of water is added. After a short time a white, almost solid mass is precipitated, which is separated by filtration by suction and is then carefully washed with water and dried. A practically white powder is obtained, which is insoluble in water and ethyl alcohol, but is rather soluble in an aqueous caustic soda solution and does not melt at temperatures below 250° C. By treating the product with concentrated aqueous hydrochloric acid it is decomposed with the evolution of ethylene and precipitation of silicic acid. After diluting the filtered hydrochloric acid solution with water, mercuric oxide may be precipitated with the aid of aqueous caustic soda solution and mercuric sulfide with the aid of ammonia and ammonium sulfide solution.

*Example 2.*—33.2 parts of ethoxy ethyl mercuric acetate are dissolved in water and a mixture of 40 parts of commercial water glass and 40 parts of water is added. After a short time a thick pulp is formed, which is filtered off by suction, washed with water and dried. The product obtained is a white powder which is practically insoluble in water and ethyl alcohol, does not melt on heating up to 250° C., and behaves, when treated with concentrated aqueous hydrochloric acid and caustic soda solution, in the same manner as the product described in the foregoing example.

*Example 3.*—34.6 parts of the n-propylether of hydroxyethyl-mercuric acetate are dissolved in 80 parts of water, the whole being then mixed with a mixture of 40 parts of commercial water glass and 100 parts of water. The resulting pulp is filtered off by suction, washed with water and dried. The properties and the chemical behaviour of the product are the same as those of the products described in the foregoing examples.

If, in the place of the said ether mercuric acetate, 37.2 parts of the methylether of cyclohexanol mercuric acetate are employed, a white product is obtained having about the same properties.

*Example 4.*—29 parts of ethoxy ethyl mercuric hydroxide are dissolved in 100 parts of water, and a mixture of 40 parts of commercial water glass and 200 parts of water is added. The reaction mixture is saturated with carbon dioxide, whereby a white precipitate is formed which is then filtered off by suction, washed with water and dried. A white powder is obtained which is insoluble in water and ethyl alcohol, and does not melt on heating up to 250° C. In the place of carbon dioxide a dilute aqueous solution of acetic acid may be employed.

*Example 5.*—15 parts of methoxy ethyl mercuric chloride are dissolved in 300 parts of water, whereupon a mixture of 20 parts of water glass and 30 parts of water is added, and the whole is slightly acidified with an aqueous acetic acid solution. By filtering off the resulting precipitate by suction, washing and drying a white powder is obtained which is almost insoluble in practically all solvents, and does not melt on heating up to 250° C.

*Example 6.*—12 parts of the ethyl ether of hydroxy propyl mercuric hydroxide are dissolved in 100 parts of acetone, whereupon, while cooling and shaking, 1.7 parts of silicon tetrachloride are added. After several hours 200 parts of water are added and a sufficient quantity of sodium acetate to render the reaction mixture neutral against Congo. A slightly brownish colored precipitate separates out which is filtered by suction, washed with water and dried. The resulting yellowish brown powder is insoluble in water, ethyl alcohol, acetone and ethyl ether.

*Example 7.*—An aqueous solution of 50 parts of commercial water glass is introduced into a dilute aqueous solution of hydrochloric acid, and the resulting clear solution is subjected to dialysis against water until no silver chloride is precipitated from a sample by the addition of silver nitrate. The dialyzed solution is then stirred for several hours with 28 parts of methoxy ethyl mercuric hydroxide. The resulting product is filtered off by suction, washed with water and dried. A white product is obtained which is practically insoluble in water and in organic solvents.

*Example 8.*—221 parts of methoxy ethyl mercuric hydroxide dissolved in 400 parts of acetone are mixed with a solution of 53 parts of a mixed silicic-acetic anhydride in 212 parts of acetone, whereby the temperature of the reaction mixture is slightly increased. After standing for several days the solvent is distilled off and the residue is stirred with water, filtered by suction, washed with water and dried. An almost white powder is obtained which is insoluble in water and organic solvents. On heating the product with aqueous hydrochloric acid ethylene is evolved together with the formation of a clear solution. By adding aqueous caustic soda solution to the latter yellow mercuric oxide is obtained, whereas black mercuric sulfide is obtained by the addition of ammonia and ammonium sulfide.

By replacing the aforementioned hydroxide by 255 parts of methoxy ethyl mercuric acetate a mercury-silicon compound is obtained the physical and chemical properties of which are analogous to those of the aforementioned product.

*Example 9.*—276 parts of methoxy ethyl mercuric hydroxide are dissolved in 300 parts of acetone and then incorporated with a solution of 50 parts of ortho-phosphoric acid in 100 parts of acetone. A thick mass of crystals is precipitated, which is filtered by suction and recrystallized from hot ethyl alcohol.

Nearly colorless crystals of apparently secondary methoxy ethyl mercuric phosphate are obtained, which easily dissolve in water, more difficultly in ethyl alcohol and very difficultly in acetone, benzene and petroleum ether. The compound melts with decomposition at 112–113° C.

*Example 10.*—552 parts of methoxy ethyl mercuric hydroxide are dissolved in twice the quantity of ethyl alcohol, and are then added to a solution of 90 parts of anhydrous oxalic acid in ethyl alcohol. After a short time a thick, white mass of crystals separates out, which after being filtered by suction is recrystallized from ethyl alcohol. The resulting methoxy ethyl mercuric oxalate gives with water solutions of up to about 4% strength; it dissolves fairly easily in ethyl alcohol but is nearly insoluble in petroleum ether. It melts at about 164–165° C. with decomposition.

The same oxalate can be obtained by the addition of 45 parts of anhydrous oxalic acid dissolved in methyl alcohol to a solution of 318 parts of methoxy ethyl mercuric acetate in methyl alcohol.

However it is impossible to obtain the above oxalate by reacting with a solution of methoxy ethyl mercuric acetate in methyl alcohol on an aqueous solution of ammonium oxalate; likewise the reaction of methoxy ethyl mercuric acetate with oxalic acid in aqueous solution does not lead to the oxalate.

*Example 11.*—138 parts of methoxy ethyl mercuric hydroxide are dissolved in 500 parts of acetone and then mixed with a solution of 29.5 parts of succinic acid in acetone. After some time a mass of crystals separates out, which is filtered off by suction and dried. The resulting methoxy ethyl mercuric succinate forms well shaped crystals, which have a melting point of 93° C. and dissolve in water very easily; in ethyl alcohol and acetone they are fairly easily soluble.

*Example 12.*—165 parts of ortho-methoxy-cyclohexyl mercuric hydroxide (a syrupy liquid, which is obtainable by the action of sodium hydroxide on ortho-methoxy-cyclohexyl mercuric chloride followed by extraction of the dry mass with ethyl alcohol) are added to a solution of 25 parts of phosphoric acid in ethyl alcohol. After some time the phosphate which has separated out is filtered off by suction and dried. It forms an almost white powder, which is difficultly soluble in most solvents. On heating it becomes dark, but does not melt up to a temperature of 250° C.

The above phosphate cannot be obtained by the interaction of methoxy-cyclohexyl-mercuric acetate with sodium phosphate in an aqueous solution.

*Example 13.*—276 parts of methoxy ethyl mercuric hydroxide are dissolved in 2000 parts of diethylether and then mixed with an ethereal solution of 45 parts of anhydrous oxalic acid. The mass of crystals obtained is filtered off by suction and, by recrystallization from ethyl alcohol, the oxalate described in Example 10 is obtained.

*Example 14.*—552 parts of methoxy ethyl mercuric hydroxide are dissolved in 2000 parts of acetone. A solution of 150 parts of tartaric acid in acetone is then added. After a short time a crystal mass is obtained, which is filtered off by suction and dried. It is completely pure but may be recrystallized from hot methyl alcohol.

It forms colorless crystals, having a melting point of 153° C. and which are easily soluble in water and ethyl alcohol.

*Example 15.*—33 parts of an olefine mixture, which consists of about 10% of amylene, 45% of ethylene and 45% of propylene are dissolved in 500 parts of methyl alcohol and then mixed with a solution of 275 parts of mercuric acetate in 1500 parts of methyl alcohol. The whole is allowed to stand for some time and as soon as a test portion does not separate out yellow mercuric oxide on the addition of an aqueous caustic soda solution, the reaction product is freed in vacuo from the excess of methyl alcohol and the acetic acid formed.

The oily mixture of methoxy-alkyl-mercuric acetates, which is permeated by crystals, is dissolved in aqueous ethyl alcohol and the solution is added to an aqueous solution of commercial water glass. The precipitated mass is filtered off by suction and dried. The mixture of methoxy-alkyl-mercuric silicates obtained is an almost white powder, which is insoluble in water and practically all organic solvents.

We claim:—

1. Organic mercuric salts corresponding to the formula:

$$A\text{—}(Hg\text{—}C_2H_2(R)_2\text{—}O\text{—}R_1)_n$$

in which A denotes the radical of an oxygen-bearing polybasic acid of a non-metallic element of the fourth and fifth group of the periodic system, R denotes hydrogen or an alkyl radical, $R_1$ denotes an alkyl radical containing from one to three carbon atoms and $n$ denotes an integral number which, at most, is equivalent to the number of acid groups in said polybasic acid.

2. Organic mercuric salts corresponding to the formula:

$$A\text{—}(Hg\text{—}C_2H_2(R)_2\text{—}O\text{—}R_1)_n$$

in which A denotes the radical of an oxygen bearing polybasic carboxylic acid, R denotes hydrogen or an alkyl radical, $R_1$ denotes an alkyl radical and $n$ denotes an integral number which, at most, is equivalent to the number of acid groups in said polybasic acid.

3. Alkoxy-alkyl-mercuric oxalates.

4. Methoxyethyl-mercuric oxalate.

5. Organic mercuric salts corresponding to the formula:

$$A\text{—}(Hg\text{—}C_2H_2(R)_2\text{—}O\text{—}R_1)_n$$

in which A denotes the radical of phosphoric acid, R denotes hydrogen or an alkyl radical, $R_1$ denotes an alkyl radical and $n$ denotes an integral number which, at most, is equivalent to the number of acid groups in said polybasic acid.

6. Methoxyethyl-mercuric phosphates.

7. Organic mercuric salts corresponding to the formula:

$$A\text{—}(Hg\text{—}C_2H_2(R)_2\text{—}O\text{—}R_1)_n$$

in which A denotes the radical of silicic acid, R denotes hydrogen or an alkyl radical, $R_1$ denotes an alkyl radical containing from one to three carbon atoms and $n$ denotes an integral number which, at most, is equivalent to the number of acid groups in said polybasic acid.

8. An alkoxy-alkyl-mercuric silicate.

9. A methoxy-ethyl-mercuric silicate.

FRITZ SCHÖNHÖFER.
WILHELM BONRATH.